United States Patent
Bordeaux et al.

(10) Patent No.: US 6,335,300 B1
(45) Date of Patent: Jan. 1, 2002

(54) GLASS SHEET DESIGNED TO BE HEAT TEMPERED

(75) Inventors: Frédéric Bordeaux, Bourg la Reine; Lucas Duffrene, Paris, both of (FR)

(73) Assignee: Saint-Gobain Glass France (FR)

( * ) Notice: Subject to any disclaimer, the term of this patent is extended or adjusted under 35 U.S.C. 154(b) by 0 days.

(21) Appl. No.: 09/403,741

(22) PCT Filed: Mar. 2, 1999

(86) PCT No.: PCT/FR99/00467

§ 371 Date: Feb. 29, 2000

§ 102(e) Date: Feb. 29, 2000

(87) PCT Pub. No.: WO99/44952

PCT Pub. Date: Sep. 10, 1999

(30) Foreign Application Priority Data

Mar. 2, 1998 (FR) ............................................. 98 02493

(51) Int. Cl.$^7$ .......................... C03C 3/078; C03C 3/087
(52) U.S. Cl. .......................................... 501/72; 501/70
(58) Field of Search ............................. 501/70, 71, 72

(56) References Cited

U.S. PATENT DOCUMENTS

| | | | |
|---|---|---|---|
| 2,669,807 A | | 2/1954 | Smith |
| 5,071,796 A | * | 12/1991 | Jones et al. ................... 501/70 |
| 5,320,986 A | * | 6/1994 | Taniguchi et al. ............. 501/70 |
| 5,459,110 A | * | 10/1995 | Brix ............................. 501/67 |
| 5,618,763 A | * | 4/1997 | Frank et al. ..................... 501/5 |
| 5,656,558 A | * | 8/1997 | Brix et al. ..................... 501/70 |
| 5,763,343 A | * | 6/1998 | Brix et al. ..................... 501/67 |
| 5,776,844 A | * | 7/1998 | Koch et al. .................... 501/70 |
| 5,858,894 A | * | 1/1999 | Nagashima et al. .......... 501/70 |
| 5,858,896 A | * | 1/1999 | Nagashima et al. .......... 501/66 |
| 5,858,897 A | * | 6/1999 | Maeda et al. .................. 501/70 |
| 5,932,503 A | * | 8/1999 | Kim et al. ..................... 501/70 |
| 5,952,255 A | * | 9/1999 | Seto et al. ..................... 501/70 |
| 5,958,812 A | * | 9/1999 | Koch et al. .................... 501/70 |
| 5,990,023 A | * | 11/1999 | Siedel et al. .................. 501/70 |
| 6,017,837 A | * | 1/2000 | Nagashima et al. .......... 501/70 |
| 6,054,401 A | * | 4/2000 | Sugiura et al. ................ 501/70 |
| 6,063,718 A | * | 5/2000 | El Khiati et al. ............. 501/70 |
| 6,087,284 A | * | 7/2000 | Brix et al. ..................... 501/70 |

FOREIGN PATENT DOCUMENTS

| | | |
|---|---|---|
| EP | 0 555 552 | 8/1993 |
| FR | 2 297 817 | 8/1976 |

* cited by examiner

*Primary Examiner*—Karl Group
(74) *Attorney, Agent, or Firm*—Pennie & Edmonds LLP

(57) ABSTRACT

The subject of the invention is a glass sheet intended to be thermally toughened, the matrix of which is of the silica-soda-lime type, having an expansion coefficient α of greater than $100 \times 10^{-7}$ K$^{-1}$, a Young's modulus E of greater than 60 GPa and a thermal conductivity k of less than 0.9 W/m.K.

5 Claims, No Drawings

GLASS SHEET DESIGNED TO BE HEAT TEMPERED

BACKGROUND OF THE INVENTION

The invention relates to glass sheets intended to be thermally toughened and more precisely to glass sheets intended to be fitted into motor vehicles.

Although the invention is not limited to such applications, it will be more particularly described with reference to the production of thermally toughened thin glass sheets, i.e. those having a thickness of less than 2.5 mm. This is because motor-vehicle manufacturers are at the present time increasingly tending to wish to limit the weight corresponding to the glazing, while the glass area of the motor vehicles is increasing. A reduction in the thickness of the glass sheets is therefore needed in order to meet these new requirements.

With regard to the thermal toughening of these glass sheets, and more particularly in order to produce the side windowpanes of motor vehicles, the requirements of European Regulation No. 43, relating to the homologation of safety glazing and of the materials for glazing intended to be fitted into motor vehicles and their trailers, have to be met. According to this regulation, the constraints on toughening must be such that the glazing, in the event of it breaking, does so into a number of fragments which, over any 5×5 cm square, is neither less than 40 nor greater than 350 (the latter number being increased to 400 in the case of glazing having a thickness of less than or equal to 2.5 mm). Again according to these requirements, no fragment must be greater than 3.5 $cm^2$, except possibly in a strip 2 cm in width around the periphery of the glazing and within a 7.5 cm radius around the point of impact, and there must not be any elongate fragment of greater than 7.5 cm.

Conventional toughening plants, especially the devices for bending and toughening glass sheets, by making them run along a roller conveyor having a profile that is curved in the direction in which the glass sheet run, allow 3.2 mm thick glass sheets to be toughened according to European Regulation No. 43 completely satisfactorily.

The abovementioned techniques are known, especially from French Patents FR-B-2,242,219 and FR-B-2,549,465 and consist in making the glass sheets, heated in a horizontal furnace, run between two layers of rollers —or other rotating elements —arranged with a curvilinear profile and passing through a terminal toughening zone. In order to produce side windowpanes, sunroofs or other glazing articles, especially of cylindrical shape, the layers consist of, for example, right cylindrical rods arranged with a circular profile. The layers may also consist of elements giving the glazing a secondary curvature, such as conical elements or else those of the diabolo type or barrel type. This technique allows a very high production capacity since, on the one hand, the glass sheets do not have to be widely spaced, it being possible for one glass sheet to enter the forming zone without any problem while the treatment of the previous sheet has yet to be completed and, on the other hand, if the length of the rollers so allow, two or three glass sheets side by side may be treated simultaneously.

The running speed of the glass plates or sheets is at least 10 cm/s and is about 15 to 25 cm/s. The speed normally does not exceed 30 cm/s in order to allow sufficient toughening time.

When the thickness of the glass sheets decreases, and in order to meet the same toughening standards, the heat-exchange coefficient must be greatly increased. To do this, it is possible to increase the blowing power of the toughening devices. Such modifications entail, on the one hand, major investment and, on the other hand, higher operating costs. Moreover, the increase in the blowing power may impair the optical quality of the glass sheets and/or their flatness.

The inventors were thus tasked with the mission of producing glass sheets toughened according to European Regulation No. 43, having a thickness of less than 2.5 mm on standard toughening plants of the type described above.

SUMMARY OF THE INVENTION

Thus, the object of the invention is to provide a glass sheet intended to be thermally toughened, the intrinsic properties of which lead to results in the case of thicknesses of less than 2.5 mm but are equivalent to those usually obtained in the case of thicknesses of greater than 3 mm, with the same cooling devices.

This object is achieved by a glass sheet intended to be thermally toughened, the matrix of which is of the silica-soda-lime type and has an expansion coefficient $\alpha$ of greater than $100 \times 10^{-7} K^{-1}$, a Young's modulus E of greater than 60 GPa and a thermal conductivity k of less than 0.9 W/m.K.

Such properties actually give the glass sheet the possibility of being thermally toughened according to European Regulation No. 43 when this sheet has a thickness of less than 2.5 mm.

DETAILED DESCRIPTION OF THE INVENTION

According to a preferred embodiment of the invention, the glass sheet has a Poisson's ratio of greater than 0.21.

The elastic modulus and the Poisson's ratio are determined by the following test: a glass test piece having the dimensions 100×10 $mm^2$ and a thickness of less than 6 mm is subjected to a 4-point bending, the outer supports of which are separated by 90 mm and the inner supports by 30 mm. A strain gauge is adhesively bonded to the centre of the glass plate. The principal displacements (in the length of the plate and in its width) are calculated therefrom. The applied stress is calculated from the applied force. The relationships between stress and principal displacements allow the elastic modulus and the Poisson's ratio to be determined.

Also preferably, the specific heat of the glass sheet is greater than 740 J/kg.K.

According to an advantageous embodiment of the invention the glass sheet has a density of greater than 2520 $kg/cm^3$ and preferably greater than 2550 $kg/m^3$.

Again preferably, the glass sheet according to the invention satisfies the following relationship:

$$\alpha.E/K > 8000$$

The glass matrices of the glass sheets according to the invention are advantageously chosen from among matrices having, in percentages by weight, the following constitutes:

| | |
|---|---|
| $SiO_2$ | 45–69% |
| $Al_2O_3$ | 0–14% |
| CaO | 0–22% |
| MgO | 0–10% |
| $Na_2O$ | 6–24% |
| $K_2O$ | 0–10% |
| BaO | 0–12% |

-continued

| | |
|---|---|
| $B_2O_3$ | 0–6% |
| ZnO | 0–10%. |

The glass compositions proposed above have the advantage in particular of being able to be melted and converted into glass ribbon on float-type plants, at temperatures close to those adopted for the manufacture of conventional silica-soda-lime glass.

The compositions are actually chosen to have a temperature corresponding to the viscosity η, expressed in poise, such that the logη=2 is less than 1500° C. in order to allow melting under standard conditions. Moreover, the compositions according to the invention have a sufficient difference between the forming temperature of the glass and its liquidus temperature; this is because, in the technology of float glass in particular, it is important for the liquidus temperature of the glass to remain equal to or less than the temperature corresponding to the viscosity, expressed in poise, such that logη=3.5. Advantageously, this difference is at least from 10° C. to 30° C.

The $SiO_2$ content must not exceed 69%; above this, the melting of the batch and the refining of the glass require high temperatures which cause the furnace refractories to undergo accelerated wear. Below 45%, the glasses according to the invention are insufficiently stable. Advantageously, the $SiO_2$ content is greater than 53%.

Alumina acts as a stabilizer; this oxide helps to increase the strain-point temperature. The $Al_2O_3$ content must not exceed 14%, or else melting becomes too difficult and the high-temperature viscosity of the glass increases unacceptably.

The glass compositions according to the invention may also include the oxide $B_2O_3$. In this case, the $B_2O_3$ content does not exceed 6% as, above this value, the volatilization of the boron in the presence of alkali metal oxides during production of the glass may become significant and lead to corrosion of the refractories. Furthermore, higher $B_2O_3$ contents impair the quality of the glass. When $B_2O_3$ is present in the glass composition with a content of greater than 4%, the $Al_2O_3$ content is advantageously greater than 10%.

The influence of the other oxides on the ability of the glasses according to the invention to be melted and floated on a metal bath, as well as on their properties, is as follows: the alkali metal oxides, and more particularly $Na_2O$ and $K_2O$, make it possible to keep the melting point of the glasses according to the invention and their high-temperature viscosity within acceptable limits. To do this, the sum of the contents of these alkali metal oxides remains greater than 11% and preferably greater than 13%.

The alkaline-earth metal oxides introduced into the glasses according to the invention also have the effect of reducing the melting point, as well as the high-temperature viscosity of the glasses. The sum of the contents of these oxides is at most 6% and preferably greater than 8%. Above approximately 28%, the tendency of the glasses to devitrify may increase to levels incompatible with the process of floating them on a metal bath.

The glass compositions may furthermore contain colorants, especially for applications of the motor-vehicle window type; these may especially be oxides of iron, of chronium, of cobalt, of nickel, of selenium, etc.

According to a first embodiment of the invention, the glass sheet according to the invention is such that its matrix comprises, in percentages by weight, the abovementioned constitutes and satisfies the relationships:

$Na_2O+K_2O>20\%$ $Na_2O+K_2O+CaO>27\%$.

According to a second embodiment of the invention, the glass matrix satisfies the relationships:

$Na_2O+K_2O>17\%$ $Na_2O+K_2O+CaO>35\%$.

According to other embodiments according to the invention, the glass matrix satisfies the relationships:

$Na_2O+K_2O>17\%$ $Na_2O+K_2O+CaO>29\%$ when $Na_2O>18\%$ and/or $K_2O>5\%$ and/or $Al_2O_3<3\%$.

According to the latter embodiments and when the oxide $TiO_2$ is present in the matrix, the latter furthermore satisfies the relationship:

$TiO_2+Al_2O_3<3\%$.

All the glass matrices described according to these various embodiments allow the production of glass sheets having a thickness of less than 2.5 mm and advantageously greater than 1.6 mm, which may be thermally toughened in accordance with European Regulation No. 43 on toughening devices originally intended for toughening glass with a thickness of 3.15 mm.

The advantages afforded by the glass compositions according to the invention will be better appreciated with the help of the examples presented below.

Various glass compositions in accordance with the invention were melted and converted into a glass ribbon according to the invention. There are 6 of these compositions (numbered from 1 to 6). The composition T is a control composition, corresponding to standard glass for motor-vehicle windows, which may be thermally toughened in accordance with European Regulation No. 43 when it is in the form of a glass sheet with a thickness of 3.15 mm.

These various compositions are given in the table below:

TABLE 1

| | $SiO_2$ | $Al_2O_3$ | CaO | MgO | $Na_2O$ | $K_2O$ | BaO |
|---|---|---|---|---|---|---|---|
| T | 71.3 | 0.6 | 9.6 | 4.1 | 13.6 | 0.3 | 0 |
| 1 | 67.1 | 2.1 | 8.5 | 0.1 | 16.0 | 5.1 | 0.1 |
| 2 | 63.59 | 0.45 | 13.19 | 0.07 | 21.75 | 0.01 | 0 |
| 3 | 63.22 | 2.45 | 13.40 | 0.1 | 17.5 | 2.65 | 0 |
| 4 | 64.8 | 2.0 | 10.4 | 0.5 | 17.4 | 4.9 | 0 |
| 5 | 64.0 | 2.0 | 10.4 | 0.5 | 16.3 | 4.8 | 2 |
| 6 | 65.0 | 1.0 | 14.1 | 0 | 18.9 | 1.0 | 0 |

The various properties of the glasses indicated above are given in the following table:

TABLE 2

| | T | 1 | 2 | 3 | 4 | 5 | 6 |
|---|---|---|---|---|---|---|---|
| Expansion coefficient ($10^{-7}$ $K^{-1}$) | 90 | 11 6 | 12 8 | 12 0 | 12 2 | 12 0 | 12 0 |
| Young's modulus (GPa) | 70 | 68 | 70 | 70 | 68 | 68 | 69 |
| Thermal | 1 | 0.8 | 0.8 | 0.8 | 0.8 | 0.8 | 0.8 |

TABLE 2-continued

|  | T | 1 | 2 | 3 | 4 | 5 | 6 |
|---|---|---|---|---|---|---|---|
| Conductivity (W/m.K) |  | 5 | 7 | 3 | 6 | 3 | 5 |
| Specific heat (J/kg.K) | 855 | 852 | 872 | 857 | 857 | 843 | 861 |
| Density (kg/m³) | 2580 | 2560 | 2660 | 2648 | 2626 | 2731 | 2670 |
| Poisson's ratio | 0.22 | 0.22 | 0.23 | 0.23 | 0.23 | 0.23 | 0.23 |

It has been demonstrated that these glasses can be melted and that they can be for the most part converted using the float process.

When testing these glass compositions, it is apparent that they can be melted under completely conventional conditions and even at temperatures well below those of the control composition T. These temperature differences make it possible to envisage a reduction in energy costs.

On the other hand, if it appears that the forming ranges, i.e. the differences between the temperature corresponding to a viscosity η, expressed in poise, such that logη=3.5 and the liquidus temperature, are narrower in the case of the compositions according to the invention; however, they are sufficient to guarantee good-quality forming.

It is also apparent that the initial toughening temperature is markedly lower in the case of the glasses according to the invention; this also leads to energy cost reductions and to less rapid water of the furnaces.

The final table given below shows the thickness of the glass sheets which have been toughened in accordance with European Regulation No. 43.

TABLE 3

|  | T | 1 | 2 | 3 | 4 | 5 | 6 |
|---|---|---|---|---|---|---|---|
| Thickness (mm) | 3.15 | 2.50 | 2.40 | 2.35 | 2.40 | 2.45 | 2.45 |

It is therefore clearly apparent that the glass sheets produced from the compositions according to the invention allow so-called "safety" thermal toughening for thicknesses of less than 2.5 mm using the standard devices which limit the said toughening to a thickness of 3.15 mm when the glass is of the composition T.

Moreover, the optical quality of the glass sheets according to the invention, having a thickness of less than 2.5 mm and thermally toughened, is quite comparable to that of glass sheets having a thickness of 3.15 mm produced from the control composition T.

What is claimed is:

1. A glass sheet intended to be thermally toughened comprising a silica-soda matrix, wherein said sheet has an expansion coefficient of greater than $100 \times 10^{-7} K^{-1}$, a Young's modulus E of greater than 60 GPa and a thermal conductivity k of less than 0.9 W/m.K and said matrix has a $SiO_2$ content of 45 to 65 wt. %, wherein said matrix comprises $Na_2O$ and optionally $K_2O$ in amounts which satisfy the following relationship:

$$Na_2O + K_2O > 20 \text{ wt \%}$$

and wherein said matrix comprises $Na_2O$ and CaO and optionally $K_2O$ in amounts which satisfy the following relationship:

$$Na_2O + K_2O + CaO > 27 \text{ wt \%}.$$

2. A glass sheet intended to be thermally toughened, comprising a silica-soda matrix, wherein said sheet has an expansion coefficient a of greater than $100 \times 10^{-7} K^{-1}$, a Young's modulus E of greater than 60 GPa and a thermal conductivity k of less than 0.9 W/m.K and said matrix has a $SiO_2$ content of 45 to 65 wt %, wherein said matrix comprises $Na_2O$ and optionally one or more of $K_2O$ or CaO in amounts which satisfy the following relationship:

$$Na_2O + K_2O + CaO > 27 \text{ wt \%}.$$

3. A glass sheet intended to be thermally toughened, comprising a silica-soda matrix, wherein said sheet has an expansion coefficient a of greater than $100 \times 10^{-7} K^{-1}$, a Young's modulus E of greater than 60 GPa and a thermal conductivity k of less than 0.9 W/m.K and said matrix has a $SiO_2$ content of 45 to 65 wt %, wherein said matrix comprises $Na_2O$ and CaO and optionally $K_2O$ in amounts which satisfy the following relationships:

$$Na_2O + K_2O > 17\%$$

$$Na_2O + K_2O + CaO > 35 \text{ wt \%}.$$

4. A glass sheet comprising a silica-soda matrix, wherein the sheet has an expansion coefficient a of greater than $100 \times 10^{-7} K^{-1}$, a Young's modulus E of greater than 60 Gpa and a thermal conductivity k of less than 0.9 W/m.K, and wherein the matrix comprises $Na_2O$ and optionally one or more of $K_2O$ or CaO in amounts that satisfy the following relationship:

$$Na_2O + K_2O + CaO > 35 \text{ wt \%}.$$

5. Glass sheet according to claim 4, wherein said matrix satisfies the relationship:

$$Na_2O + K_2O > 17 \text{ wt \%}.$$

* * * * *

UNITED STATES PATENT AND TRADEMARK OFFICE
CERTIFICATE OF CORRECTION

PATENT NO. : 6,335,300 B1
DATED : January 1, 2002
INVENTOR(S) : Bordeaux et al.

It is certified that error appears in the above-identified patent and that said Letters Patent is hereby corrected as shown below:

Column 5,
Line 52, insert -- , -- after toughened;

Column 6,
Lines 17, 28 and 39, replace "a" with -- $\alpha$ --.

Signed and Sealed this

Sixteenth Day of April, 2002

Attest:

JAMES E. ROGAN
Attesting Officer
Director of the United States Patent and Trademark Office